United States Patent Office 3,312,663
Patented Apr. 4, 1967

3,312,663
POLYAMIDE ESTERS
Wayne Richard Sorenson, Ponca City, Okla., assignor to E. I. du Pont de Nemours and Company, Wilmington, Del., a corporation of Delaware
No Drawing. Filed June 17, 1963, Ser. No. 288,535
10 Claims. (Cl. 260—47)

This invention relates to the preparation of aromatic polyimide articles and coatings. More particularly, it relates to the preparation of relatively stable intermediates that can be easily converted to the polyimides when desired.

The importance of relatively stable intermediates that can be easily converted to the final desired product can be appreciated by one skilled in the art. The final products, the aromatic polyimides, are known for their chemical and thermal stability. Since they do not melt easily nor dissolve easily, the difficulty of shaping this polymer into useful articles is a serious obstacle to commercial development. Recently, processes utilizing the shaping of a polyamide-acid intermediate followed by conversion to the polyimide have been proposed. However, the polyamide-acids, in many cases, tend to convert to polyimides during storage or, in some cases, are of high stability, converting only upon exposure to temperatures which are extremely high for organic materials.

It is an object of this invention to provide intermediates that are sufficiently stable to be stored for long periods, yet sufficiently "unstable" to convert relatively easily to polyimide when desired. Other objects will appear hereinafter.

The objects are accomplished by the use of an intermediate linear polymer, an aromatic polyamide-ester having the formula:

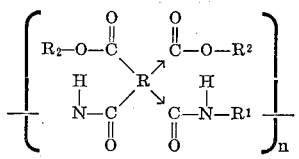

wherein
the arrows denote isomerism [1];
R is an aromatic tetravalent organic radical;
$R^1$ is arylene;
$R^2$ is alkyl or aryl; and
$n$ is an integer sufficiently high to provide a film-forming polymer, i.e. having an inherent viscosity at 30° C. of at least 0.1, preferably 0.3–5.0, as measured as a 0.5% solution in a suitable solvent (concentrated sulfuric acid, N,N-dimethylacetamide, etc.).

The process for producing such polyamide-esters involves treating certain diacyl halides; namely, dicarboalkoxy or dicarboaryloxy aryl dicarboxy halides with a primary aromatic diamine. The diacyl halides may be prepared by any method well known to those skilled in the art. Thus, one process, the preferred process, for producing the diacyl halide involves first treating suitable dianhydrides (aromatic dianhydrides) with an alcohol to form the corresponding diester diacid and then treating the diester diacid with a thionyl halide, a phosphorus halide, a benzal halide, an oxalyl halide or a carbonyl halide, e.g. thionyl chloride, phosphorus penta or trichloride, benzotrichloride, or phosgene, to form the corresponding diacyl halide. The diacyl halide may also be prepared by direct half-esterification of the tetra acid to the diester diacid followed by transformation of the free carboxyl groups to acid chloride groups.

The starting materials for forming the products by the preferred process of the present invention are aromatic diamines and diacyl halides of aromatic tetracarboxylic acid diesters. The organic diamines are characterized by the formula:

$$H_2{-}N{-}R^1{-}NH_2$$

wherein $R^1$ is a divalent aromatic radical (arylene), preferably selected from the following groups: phenylene, naphthylene, biphenylene, anthrylene, furylene, benzfurylene and

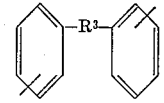

wherein $R^3$ is selected from the group consisting of an alkylene chain having 1–3 carbon atoms,

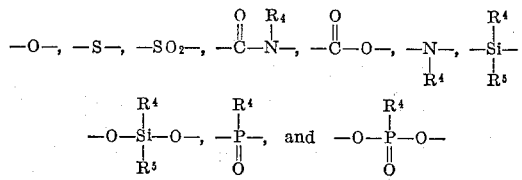

wherein $R^4$ and $R^5$ are alkyl or aryl, and substituted groups thereof. Among the diamines which are suitable for use in the present invention are: meta-phenylene diamine; para-phenylene diamine; 2,2-bis(4-amino-phenyl) propane; 4,4'-diamino-diphenyl methane; 4,4'-diamino-diphenyl sulfide; 4,4'-diamino-diphenyl sulfone; 3,3'-diamino-diphenyl sulfone; 4,4'-diamino-diphenyl ether; 2,6-di-amino-pyridine; bis-(4-amino-phenyl) diethyl silane; bis-(4-amino-phenyl) diphenyl silane; benzidine; 3,3'-dichloro-benzidine; 3,3'-dimethoxy benzidine; bis-(4-amino-phenyl) ethyl phosphine oxide; bis-(4-amino-phenyl) phenyl phosphine oxide; bis-(4-amino-phenyl)-N-butyl-amine; bis-(4-amino-phenyl)-N-methylamine; 1,5-diamino-naphthalene; 3,3'-dimethyl-4,4'-diaminobiphenyl; N-(3-amino-phenyl)-4-aminobenzamide; 4-aminophenyl-3-aminobenzoate; and mixtures thereof.

The aromatic tetracarboxylic acid dianhydrides are characterized by the following formula:

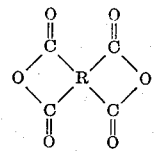

wherein R is a tetravalent aromatic radical, e.g.

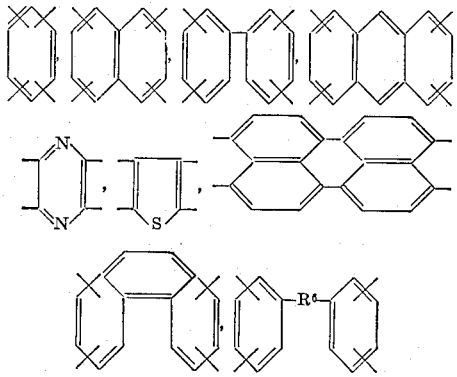

---
[1] In any recurring unit the groups to which arrows point may exist as shown or in interchanged position.

wherein $R^6$ is selected from the group consisting of $R^3$ and

In these dianhydrides every carbonyl group is attached directly to a separate carbon atom of the aromatic radical, the carbonyl groups being in pairs, the groups of each pair being adjacent to each other. Adjacent means ortho or peri, so that the dicarboxylanhydro rings are 5- or 6-membered, respectively.

The preferred aromatic dianhydrides are those in which the carbon atoms of each pair of carbonyl groups are directly attached to ortho carbon atoms in the R group to provide a 5-membered ring as follows:

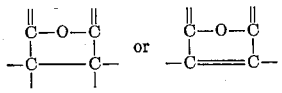

Illustrations of dianhydrides suitable for use in the present invention include:

pyromellitic dianhydride;
2,3,6,7-naphthalene tetracarboxylic dianhydride;
3,3',4,4'-diphenyl tetracarboxylic dianhydride;
1,2,5,6-naphthalene tetracarboxylic dianhydride;
2,2',3,3,'-diphenyl tetracarboxylic dianhydride;
2,2-bis(3,4-dicarboxyphenyl) propane dianhydride;
bis(3,4-dicarboxyphenyl) sulfone dianhydride;
3,4,9,10-perylene tetracarboxylic dianhydride;
bis(3,4-dicarboxyphenyl) ether dianhydride;
naphthalene1,2,4,5-tetracarboxylic dianhydride;
naphthalene-1,4,5,8-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic dianhydride;
2,2-bis(2,3-dicarboxyphenyl) propane dianhydride;
1,1-bis(2,3-dicarboxyphenyl) ethane dianhydride;
1,1-bis(3,4-dicarboxyphenyl) ethane dianhydride;
bis(2,3-dicarboxyphenyl) methane dianhydride;
bis(3,4-dicarboxyphenyl) methane dianhydride;
bis(3,4-dicarboxyphenyl) sulfone dianhydride;
benzene-1,2,3,4-tetracarboxylic dianhydride;
3,4,3',4'-benzophenone tetracarboxylic dianhydride;
2,3,2',3'-benzophenone tetracarboxylic dianhydride;
2,3,3',4'-benzophenone tetracarboxylic dianhydride; etc.

The inclusion of one or more diamines or dianhydrides other than those disclosed, e.g. aliphatic diamines or aliphatic dianhydrides, as reactants in the process may detract from one or more desirable properties of the polymeric products. However, the inclusion of such materials, to the extent that they do not detract substantially from the desirable results obtained with the aromatic reactants, is contemplated.

In the first step, the aromatic dianhydride, usually, as a solid, is treated with an alcohol to form the corresponding diester-diacid. The operable alcohols include methanol, ethanol, n-propanol, iso-propanol, the butanols, the pentanols, the hexanols, 2-ethylhexanol, isooctyl alcohol, lauryl alcohol, i.e. aliphatic alcohols of 1–12 carbon atoms, phenol and other aromatic alcohols, ethanethiol and 1–12 carbon atom aliphatic thiols, cyanoethanol and other substituted aliphatic alcohols of 1–12 carbon atoms, etc. The lower aliphatic alcohols are preferred. This reaction is performed at room temperature.

Excess alcohol is removed usually by distillation or extraction, and the next step is a treatment of the diester-diacid with a halide to convert the diester-diacid to the corresponding diester- diacyl halide. This reaction is also performed at room temperature and involves the addition of one of the following: thionyl halide, a phosphorus halide, a benzal halide, an oxalyl halide or a carbonyl halide in a solvent.

As solvents useful in the process are the organic solvents whose functional groups do not react with either the diester-diacid, the diester-diacyl halide or the subsequently added diamine to any appreciable extent. Besides being inert to the system, and preferably, being a solvent for the polyamide-ester, the organic solvent should be a solvent for the diamine, preferably for all of the reactants. To state it another way, the organic solvent is an organic liquid other than either reactant or homologs of the reactants that is a solvent for the diamine, and contains functional groups, the functional groups being groups other than monofunctional primary and secondary amino groups and other than the monofunctional dicarboxylanhydro groups. The normally liquid organic solvents of the N,N-dialkylcarboxylamide class are useful as solvents in the process of this invention. The preferred solvents are the lower molecular weight members of this class, particularly N,N - dimethylformamide and N,N - dimethylacetamide. They may easily be removed from the polyamide-ester and/or polyamide-ester shaped articles by evaporation, displacement or diffusion. Other typical compounds of this useful class of solvents are: N,N-diethylformamide, N,N-diethylacetamide, N,N-dimethylmethoxy acetamide, N-methyl caprolactam, etc. Other solvents which may be used in the present invention are: dimethylsulfoxide, N-methyl-2-pyrrolidone, tetramethyl urea, pyridine, dimethylsulfone, hexamethylphosphoramide, tetramethylene sulfone, formamide, N-methyl formamide and butyrolactone. The solvents can be used alone, in combinations of solvents, or in combination with pour solvents such as benzene, benzonitrile, dioxane, xylene, toluene, acetone and cyclohexane. It is preferred that the solvents used in this step and in the subsequent polymerization process are the same.

The next step is to polymerize the diester-diacyl halide by reaction with at least one of the aforementioned diamines. The diamine can be added to a solution of the diester-diacyl halide or vice versa. The diamine is usually added in a solvent, generally the same solvent already used for the diester-diacyl halide. Another good procedure is to add the diester-diacyl halide alone to a solution of the diamine. The polymerization is enhanced by slight warming of the reactants, usually not above 100° C., and agitation. In determining a specific temperature for forming the polyamide-ester of a specified diamine and a specified diester-diacyl halide, several factors must be considered. A starting temperature of 20–25° C. (room temperature) is preferred. The maximum permissible temperature will depend on the diamine used, the diester-diacyl halide used, the particular solvent, the percentage of polyamide-ester desired in the final composition and the minimum period of time that one desires for the reaction. For most combinations of diamines and diacyl halides useful in the present invention, it is possible to form shapeable compositions of polyamide-ester by conducting the reaction below 175° C. The particular temperature below 175° C. that must not be exceeded for any particular combination of diamine, diester-diacyl halide, solvent and reaction time to provide a shapeable reaction product will vary but can be determined by a simple test by any person of ordinary skill in the art.

The polyamide-ester composition may be stored at this point for later use or it may be immediately used to form shaped articles. After shaping the composition composed predominantly of the polyamide-ester either immediately or after storage or after sale, preferably still in the solvent (usually at least 60% solvent), into a useful article, e.g. filament, film, tube, rod, powder, etc., and drying the article, it is preferred to convert the polyamide-ester to another polymer to modify the properties of the shaped structure. Thus, the polyamide-ester may be converted by heat treatment to the corresponding polyimide, specifically by heating to a temperature of at least 125° C., preferably at least 150° C., to drive off alcohol. At 300° C. the conversion occurs in about 10 minutes. The polyimide has the following structural formula:

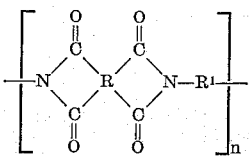

wherein

R is an aromatic tetravalent radical;
R¹ is arylene; and
n is an integer sufficiently high to provide an inherent viscosity of at least 0.1, preferably 0.3–5.0, as measured as a 0.5% solution in a suitable solvent.

The final shaped article may consist of the polyimide alone or as a blend with other polymers and/or modified with inert materials. Depending on their nature, the inert materials may be added before or after shaping. For example, fillers such as pigments, electrically conductive carbon black and metal particles, abrasives, dielectrics and lubricating polymers may be added conveniently to the intermediate polymer as such or in a solution of the intermediate polymer before shaping. Certain abrasives and electrically conductive materials are better added as surface layers. A cellular form or foam of the final polymer may be produced by adding a conventional blowing agent to the intermediate polymer, either alone or in combination with a filler, followed by heating to decompose the agent and cyclize the polymer units. Alternatively, cellular products can be made by dispersing bubbles (of air, carbon dioxide, nitrogen, etc.) into a melt or solution of the intermediate polymer before shaping and cyclization.

Instead of being shaped itself, the intermediate polymer can be used as a coating composition. The liquid coating composition containing the polymer, either alone or modified by the addition of fillers and/or foaming agents, may be applied by any of the usual techniques (doctoring, rolling, dipping, brushing, spraying) to a great variety of substrates. Such substrates include copper, brass, aluminum, steel, and other metals in the form of sheets, fibers, wires, screening; mineral structures such as asbestos; glass in the form of sheets, fibers, foams, fabrics, etc.; polymeric materials such as cellulosic materials (cellophane, wood, paper, etc.); polyolefins (polyethylene, polypropylene, polystyrene, etc.); polyesters (polyethylene terephthalate, etc.), polyamides, polyimides, perfluorocarbon polymers (polytetrafluoroethylene, copolymers of tetrafluoroethylene with hexafluoropropylene, etc.), polyurethanes, in the form of sheets, fibers, foams, woven and non-woven fabrics, screening, etc.; leather sheets; etc. The polymeric substrates can be metallized before coating, or treated with a conventional adhesive or other agent to improve surface receptivity. Films of the final cyclized polymer can be laminated to any of the above substrates, ofter with the aid of a commercially available adhesive.

The polyamide-esters, when isolated, are found to be colorless or light yellow solids. They have strong infrared bands at 3.0–3.07 microns due to N–H bonds of the amide, 5.8 microns due to C=O bonds of the ester and 6.05 microns due to C=O bonds of the amide.

The invention will be more clearly understood by referring to the examples which follow, Example 1 representing the best mode contemplated for practicing the invention. It is understood that the examples, although illustrating specific embodiments of the present invention, should not be considered limitative of the invention.

The determination of the structure is accomplished by Infrared Spectral Techniques [1] known to those skilled in the art. The majority of the infrared spectra herein were taken on pressed films by the use of a Perkin-Elmer Model 21 Spectrophotometer and a Perkin-Elmer Infracord Spectrophotometer.

Inherent viscosity, which is directly related to the molecular weight of the polymer, is defined by L. H. Cragg in the Journal of Colloid Science, volume I, pages 261–9 (May 1946) as:

$$\text{Inherent viscosity} = \frac{\ln \text{relative viscosity}}{C}$$

where relative viscosity is the ratio of the solution viscosity to the solvent viscosity, and C is the concentration of solute in solution measured as grams of polymer per 100 ml. of solution.

Example 1

2,5-dicarboethoxy terephthaloyl chloride (0.03 mole) is reacted with an equimolar amount of γ,γ-bis(4-aminophenyl) propane in 30 ml. of N,N-dimethylacetamide, the solution having been frozen to a mush. Stirring is continued for 30 minutes. The hydrochloride of the solvent is neutralized. The solution is then cast into a film of the polyamide-ester. The inherent viscosity of this polymer measured as a 0.5% solution in N,N-dimethylacetamide is 0.60. This changes very little after 16 hours' exposure in a steam bath. Heating at 300° C. for 10 minutes converts the polymer film completely to the corresponding polyamide.

Thus, the polyamide-esters are much more stable to hydrolysis under neutral conditions than the corresponding polyamide-acids.

Example 2

A solution of 3.24 g. (0.03 mole) metaphenylenediamine in 60 ml. of freshly-topped N,N-dimethyl acetamide is frozen in a Dry Ice bath. To this is added 10.41 g. (0.03 mole) of 2,5-dicarboethoxy terephthaloyl chloride. The reaction mixture sets up to a solid mush. The polyamide-ester isolated from this mush has an inherent viscosity of 0.24 in concentrated sulfuric acid.

When this procedure is repeated with the diamine solution at room temperature, the reaction mixture becomes quite hot and cloudy. After about 5 minutes the mixture sets to a solid paste. The polyamide-ester isolated from it has an inherent viscosity of 0.28 in concentrated sulfuric acid and may, upon diluting the paste with N,N-dimethylacetamide, be cast as a film or extruded as a filament.

The polymer exhibits no polymer melt temperature, but rather converts to the corresponding polyimide when heated at about 200° C.

Example 3

To 3.39 g. of 2,2-bis(4-aminophenyl) propane in 20 ml. of N,N-dimethylacetamide in an ice bath is added 5.20 g. of 2,5-dicarboethoxy terephthaloyl chloride all at once. The reaction mixture changes rapidly to a yellow viscous solution, from which polyamide-ester is isolated in three ways. Precipitation in water gives polymer of inherent viscosity 0.60 (in N,N-dimethylformamide). A sample precipitated and washed in methanol has an inherent viscosity of 0.66 in concentrated sulfuric acid and 0.70 in N,N-dimethyl formamide (after heating 1 hour at 100° C. and cooling). A third portion of the original solution is warmed about 45 minutes on a steam bath. The inherent viscosity of the precipitated polyamide-ester is 0.64 in concentrated sulfuric acid. The precipitated polyamide-ester may be in the form of a powder. The powder may be pressed into a sheet.

The polymer exhibits no polymer melt temperature,

---

[1] W. M. D. Bryant and R. C. Voter, Journal of American Chemical Society, 75, 6113 (1953); and F. W. Billmeyer, "Textbook of Polymer Chemistry," Chapter 7, Intersecience Publishers, 1957.

but rather converts to the corresponding polyimide when heated at about 200° C.

*Example 4*

To a solution of 1.08 g. of meta-phenylenediamine in 13 ml. of N,N-dimethylacetamide cooled in an ice water bath is added 3.97 g. of 2,5-dicarbo($\beta$-cyanoethoxy)-terephthaloyl chloride all at once. The reaction mixture becomes extremely hot quite rapidly. Upon cooling, the polymer separates to some extent, but redissolves upon warming or the addition of solvent. The inherent viscosity of this polymer in concentrated sulfuric acid is 0.19. The solution may be stored and then cast as a film or formed into a filament in any conventional manner.

The polymer exhibits no polymer melt temperature, but rather converts to the corresponding polyimide when heated at about 200° C.

*Example 5*

A solution of 8.68 g. (0.035 mole) of 4,4'-diaminodiphenyl sulfone in 60 ml. of N,N-dimethylacetamide is frozen in a Dry Ice bath. Then 12.145 g. of 2,5-dicarboethoxyterephthaloyl chloride is added all at once. After polymerization has occurred, the product is isolated and is found to have an inherent viscosity of 0.62 in N,N-dimethylformamide.

The corresponding polyamide-dimethyl ester having an inherent viscosity of 0.66 is prepared by the same procedure, using 2,5-dicarbomethoxy-terephthaloyl chloride. Both esters may be stored in solution and, later, formed into useful objects.

The polymer exhibits no polymer melt temperature, but rather converts to the corresponding polyimide when heated at about 200° C.

*Example 6*

To a solution of 0.0209 mole of diethyl pyromellitate-diacid chloride (same as in Examples 1, 2, 3 and 5) in 75 ml. of N,N-dimethylacetamide is added an equimolar amount of 4,4'-diaminodiphenyl ether dissolved in 75 ml. of N,N-dimethylacetamide. After 20 minutes the inherent viscosity of the polyamide-ester is determined and found to be 0.61. The polyamide-ester is converted to the corresponding polyimide by adding a small amount of triethylamine to the solution and refluxing for 35 minutes at the boiling temperature (165°–170° C.).

*Example 7*

A solution containing 3.2778 g. of the diester-diacid chloride of Example 6 (0.009445 mole) and 15 ml. of triethylamine in 40 ml. of carbon tetrachloride is stirred rapidly in a Waring Blendor with a solution of 1.8890 g. (0.009445 mole) of 4,4'-diamino diphenyl ether and 3 ml. of concentrated hydrochloric acid in 180 ml. of water. The same polyamide-ester as in Example 6 is isolated. The solution of the ester may be cast as a self-supporting film and dried.

The polymer exhibits no polymer melt temperature, but rather converts to the corresponding polyimide when heated at about 200° C.

What is claimed is:

1. A polyamide-ester consisting essentially of recurring units of:

$$\left[ \begin{array}{c} R^2-O-\overset{O}{\overset{\|}{C}} \quad \overset{O}{\overset{\|}{C}}-O-R^2 \\ \overset{H}{\underset{|}{N}}-\overset{}{\underset{\|}{C}}\diagup^{R}\diagdown \overset{}{\underset{\|}{C}}-\overset{H}{\underset{|}{N}}-R^1 \\ O \quad\quad\quad O \end{array} \right]$$

wherein the arrows denote isomerism;
R is a tetravalent radical containing at least one ring of six carbon atoms, said ring characterized by benzenoid unsaturation, the four carbonyl groups being attached directly to separate carbon atoms in the ring of the R radical and each pair of carbonyl groups being attached to adjacent carbon atoms in a ring of the R radical;
$R^1$ is a divalent radical containing at least one ring of six carbon atoms, said ring characterized by benzenoid unsaturation, the nitrogen atoms being attached directly to separate carbon atoms in a ring of the $R^1$ radical; and
$R^2$ is selected from the group consisting of alkyl and aryl;
said polyamide-ester having an inherent viscosity of at least 0.1 as measured at 30° C. as a 0.5% solution in sulfuric acid.

2. A polyamide-ester as in claim 1 having an inherent viscosity of 0.3–5.0 as measured at 30° C. as a 0.5% solution in sulfuric acid.

3. A shapeable composition consisting essentially of a polyamide-ester consisting essentially of recurring units of:

$$\left[ \begin{array}{c} R^2-O-\overset{O}{\overset{\|}{C}} \quad \overset{O}{\overset{\|}{C}}-O-R^2 \\ \overset{H}{\underset{|}{N}}-\overset{}{\underset{\|}{C}}\diagup^{R}\diagdown \overset{}{\underset{\|}{C}}-\overset{H}{\underset{|}{N}}-R^1 \\ O \quad\quad\quad O \end{array} \right]$$

wherein the arrows denote isomerism;
R is a tetravalent radical containing at least one ring of six carbon atoms, said ring characterized by benzenoid unsaturation, the four carbonyl groups being attached directly to separate carbon atoms in a ring of the R radical and each pair of carbonyl groups being attached to adjacent carbon atoms in a ring of the R radical;
$R^1$ is a divalent radical containing at least one ring of six carbon atoms, said ring characterized by benzenoid unsaturation, the nitrogen atoms being attached directly to separate carbon atoms in a ring of the $R^1$ radical; and
$R^2$ is selected from the group consisting of alkyl and aryl;
said polyamide-ester having an inherent viscosity of at least 0.1 as measured at 30° C. as a 0.5% solution in sulfuric acid in an organic solvent therefor.

4. A shapeable composition as in claim 3 wherein said polyamide-ester has an inherent viscosity of 0.3–5.0 as measured at 30° C. as a 0.5% solution in sulfuric acid.

5. A process for preparing shapeable polymeric compositions which comprises reacting at least one diamine having the structural formula $$H_2N-R^1-NH_2$$

wherein $R^1$ is a divalent radical containing at least one ring of six carbon atoms, said ring characterized by benzenoid unsaturation, the two amino groups of said diamine being attached directly to separate carbon atoms in a ring of the $R^1$ radical with at least one diester-diacyl halide of a tetracarboxylic acid dianhydride having the structural formula $$\begin{array}{c} \overset{O}{\overset{\|}{C}} \quad\quad \overset{O}{\overset{\|}{C}} \\ O\diagup \diagdown\diagup^{R}\diagdown\diagup O \\ \overset{}{\underset{\|}{C}} \quad\quad \overset{}{\underset{\|}{C}} \\ O \quad\quad O \end{array}$$

wherein R is a tetravalent organic radical containing at least one ring of six carbon atoms, said ring characterized by benzenoid unsaturation, the four carbonyl groups being attached directly to separate carbon atoms in a ring of the R radical and each pair of carbonyl groups being attached to adjacent carbon atoms in a ring of the R radical in an organic solvent for at least said diamine, said solvent being substantially inert to the system, while maintaining the temperature throughout the reaction sufficiently below 175° C. to form a polymeric composition containing a polyamide-ester of the formula

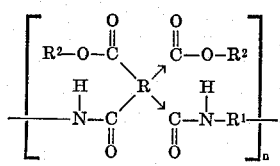

wherein the arrow denotes isomerism;
$R^2$ is selected from the group consisting of alkyl and aryl; and
$n$ is an integer sufficiently high to provide a film-forming polymer.

6. A process as in claim 5 wherein R is selected from the group consisting of

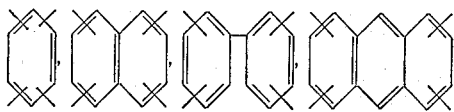

and

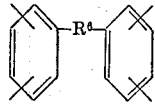

wherein $R^6$ is selected from the group consisting of an alkylene chain having 1–3 carbon atoms,

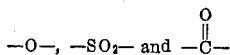

7. A process as in claim 5 wherein $R^1$ is selected from the group consisting of phenylene, biphenylene and

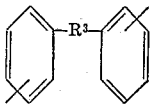

wherein $R^3$ is selected from the group —O—, —S—, and —SO$_2$—.

8. A process as in claim 5 wherein $R^2$ is selected from the group consisting of methyl, ethyl, propyl and butyl.

9. A shapeable composition as in claim 3 wherein R of said polyamide-ester is selected from the group consisting of

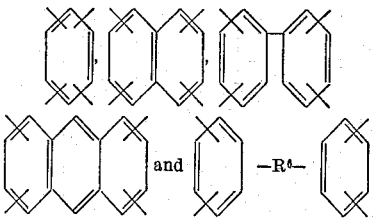

wherein $R^6$ is selected from the group consisting of an alkylene chain having 1–3 carbon atoms,

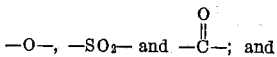

wherein $R^1$ of said polyamide-ester is selected from the group consisting of phenylene, biphenylene and

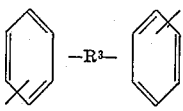

wherein $R^3$ is selected from the group

—O—, —S— and —SO$_2$—

10. A shapeable composition as in claim 3 wherein R of said polyamide-ester is

and $R^1$ of said polyamide-ester is

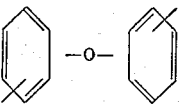

References Cited by the Examiner

UNITED STATES PATENTS

| | | | |
|---|---|---|---|
| 2,130,523 | 9/1938 | Carothers | 260—78 |
| 2,710,853 | 6/1955 | Edwards et al. | 260—78 |
| 2,831,934 | 4/1958 | Magat | 260—78 |

FOREIGN PATENTS 570,858   7/1945   Great Britain.

WILLIAM H. SHORT, *Primary Examiner.*
H. D. ANDERSON, *Examiner.*